March 23, 1965   D. M. EDGAR ETAL   3,174,439
TOW TRUCK SYSTEM AND TOW TRUCK THEREFOR
Filed May 27, 1963   3 Sheets-Sheet 1
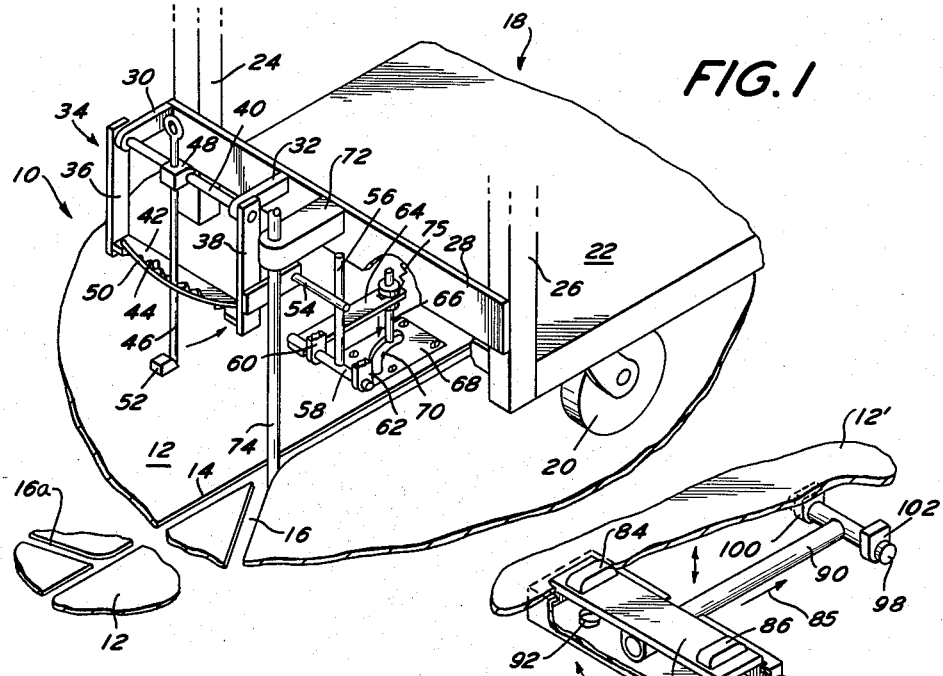
FIG. 1
FIG. 3
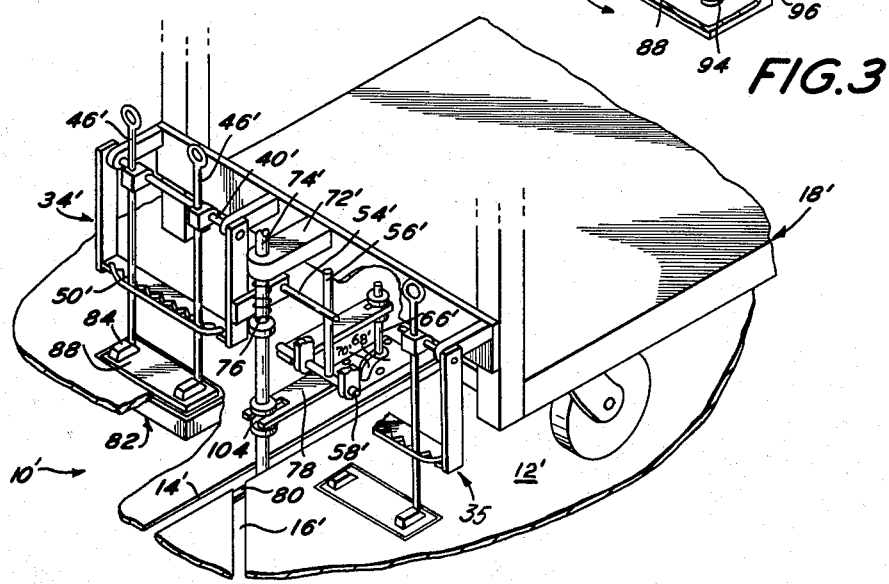
FIG. 2
INVENTORS
DAVID M. EDGAR
DEZSO KRISTOF
BY
Arthur H. Seidel
ATTORNEY March 23, 1965 D. M. EDGAR ETAL 3,174,439
TOW TRUCK SYSTEM AND TOW TRUCK THEREFOR
Filed May 27, 1963 3 Sheets-Sheet 2
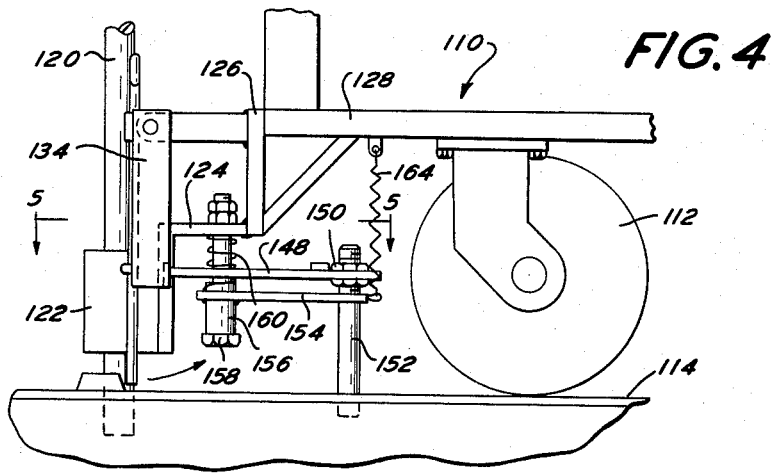
FIG. 4
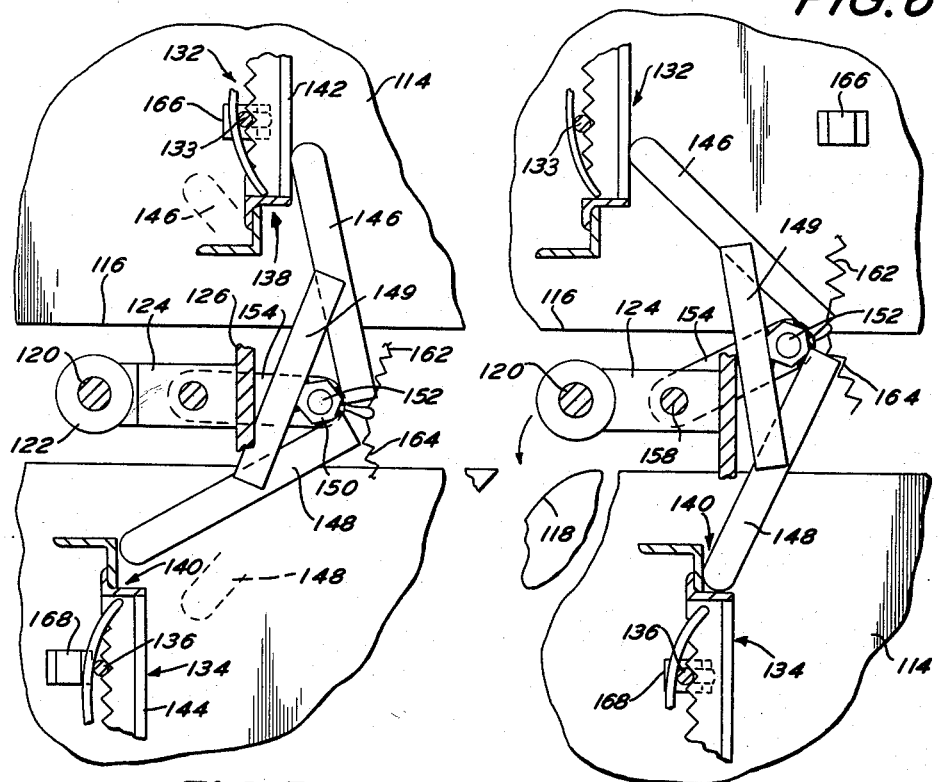
FIG. 5
FIG. 6
INVENTORS
DAVID M. EDGAR
DEZSO KRISTOF
BY
ATTORNEY March 23, 1965 D. M. EDGAR ETAL 3,174,439
TOW TRUCK SYSTEM AND TOW TRUCK THEREFOR
Filed May 27, 1963 3 Sheets-Sheet 3

INVENTORS
DAVID M. EDGAR
DEZSO KRISTOF
BY
Arthur H. Seidel
ATTORNEY

3,174,439
TOW TRUCK SYSTEM AND TOW TRUCK THEREFOR
David M. Edgar, Easton, Pa., and Dezso Kristof, Alpha, N.J., assignors to S. I. Handling Systems, Inc., Phillipsburg, N.J., a corporation of Pennsylvania
Filed May 27, 1963, Ser. No. 283,153
28 Claims. (Cl. 104—88)

This invention relates to a tow truck system and tow trucks therefor. More particularly, the tow trucks and systems of the present invention are of the type wherein a vehicle is mounted for movement along a main slot by a tow pin extending into the main slot and capable of being transferred for movement along a shunt slot.

Heretofore, it has been conventional in the art to which the present invention pertains to provide a switch plate means at the intersection of a main slot and a shunt slot to control transfer of movement from along the main slot to movement along the shunt slot. In accordance with each embodiment of the present invention, there is no such switch plate means at the intersection of the main and shunt slots. Thus, the intersection of the main and shunt slots may be uninterrupted or a land may be provided so that the shunt slots do not actually intersect the main slot. In the latter event, a means will be provided to raise the tow pin on the tow truck out of the main slot and permit the same to be moved downwardly so that it may enter the shunt slot.

In accordance with the present invention, the tow truck will be provided with one or more selector racks mounted for rotation about an axis extending transversely across the truck. Each selector rack may have one or more trip rods selectively positionable along the rack. Transfer of the truck for movement along the main slot to movement along one of the shunt slots is initiated by a movable element on the truck, said movable element being responsive to rotation of the selector rack.

In accordance with one or more embodiments of the present invention, the movable element on the truck responsive to rotation of the selector rack is an upright pin. In accordance with one embodiment, the upright pin is mounted for rotation about an upright axis for contact with a surface defining one side of the main slot. In accordance with another embodiment of the present invention, the pin is mounted for rotation about an axis parallel to the axis of rotation of the selector rack. In the last mentioned embodiment, the pin is adapted to cooperate with a fixed cam surface arcuately disposed with respect to the longitudinal axis of the adjacent portion of the main slot.

In accordance with another embodiment of the present invention, the movable element on the truck responsive to rotation of the selector rack is a horizontally disposed pin fixedly secured to the front wheels of the truck. Hence, rotation of the selector rack will result in rotation of one of the front wheels of the truck so that the truck may be caused to move in a direction corresponding to the direction of the shunt slot.

In accordance with another embodiment of the present invention, two or more abutments on one or both sides of the main slot must be simultaneously contacted by trip rods on the selector rack in order to effect a switching operation. When using abutments structurally interrelated in this manner, a substantially greater number of shunt slots may be utilized in conjunction with a single main slot. This feature becomes more desirable as the size of the system increases. Thus, prior systems using mechanical switching devices were limited to one hundred or less shunt slots. In accordance with the present invention, one thousand or more shunt slots may be provided. Thus, with thirty six different positions being provided for the rods on each selector rack, there are a total of 1296 (36×36) shunt slots into which a truck may be diverted from the main slot.

It is an object of the present invention to provide a novel tow truck system.

It is another object of the present invention to provide a novel tow truck.

It is another object of the present invention to provide a novel tow truck having a rotatable selector rack cooperatively disposed with respect to a movable element on the truck which initiates switching in response to such rotation of the selector rack.

It is another object of the present invention to provide a novel subcombination of a rotatable selector rack having adjustably positionable trip rods.

It is another object of the present invention to provide a novel tow truck system wherein switching of trucks from movement along a main slot to movement along a shunt slot is effected without the necessity for a switch plate at the intersection of the slots.

It is still another object of the present invention to provide a novel tow truck having a movable switching element responsive to a selectively adjustable selector rack.

It is still another object of the present invention to provide a novel tow truck system wherein the number of shunt slots may be substantially in excess of one hundred.

It is still another object of the present invention to provide a novel subcombination of a movable abutment means which enables a tow truck system to have a number of shunt slots which exceeds one hundred.

It is still another object of the present invention to provide a novel tow truck system wherein a tow pin on the tow truck need not be elevated or pivoted when switching from movement along a main slot to movement along a shunt slot.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a partial perspective view of a tow truck system and tow truck therefor in accordance with one embodiment of the present invention.

FIGURE 2 is a partial perspective view of another tow truck system and tow truck therefor in accordance with another embodiment of the present invention.

FIGURE 3 is a perspective view, partly broken away, illustrating a movable abutment means utilized in the system of FIGURE 2.

FIGURE 4 is a partial side elevation view of front end of a truck in accordance with another embodiment of the present invention.

FIGURES 5 and 6 are partial plan views illustrating diagrammatically the actuation of elements of the embodiment illustrated in FIGURE 4 and taken along line 5—5 in FIGURE 4 with FIGURE 5 only being taken along the line 5—5 in FIGURE 4.

Figure 7:
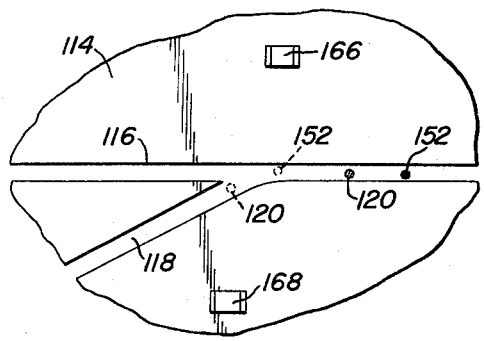

FIGURE 7 is a partial plan view of the tow truck system, illustrating the switching sequence of a truck as per FIGURES 4–6.

Figure 8:
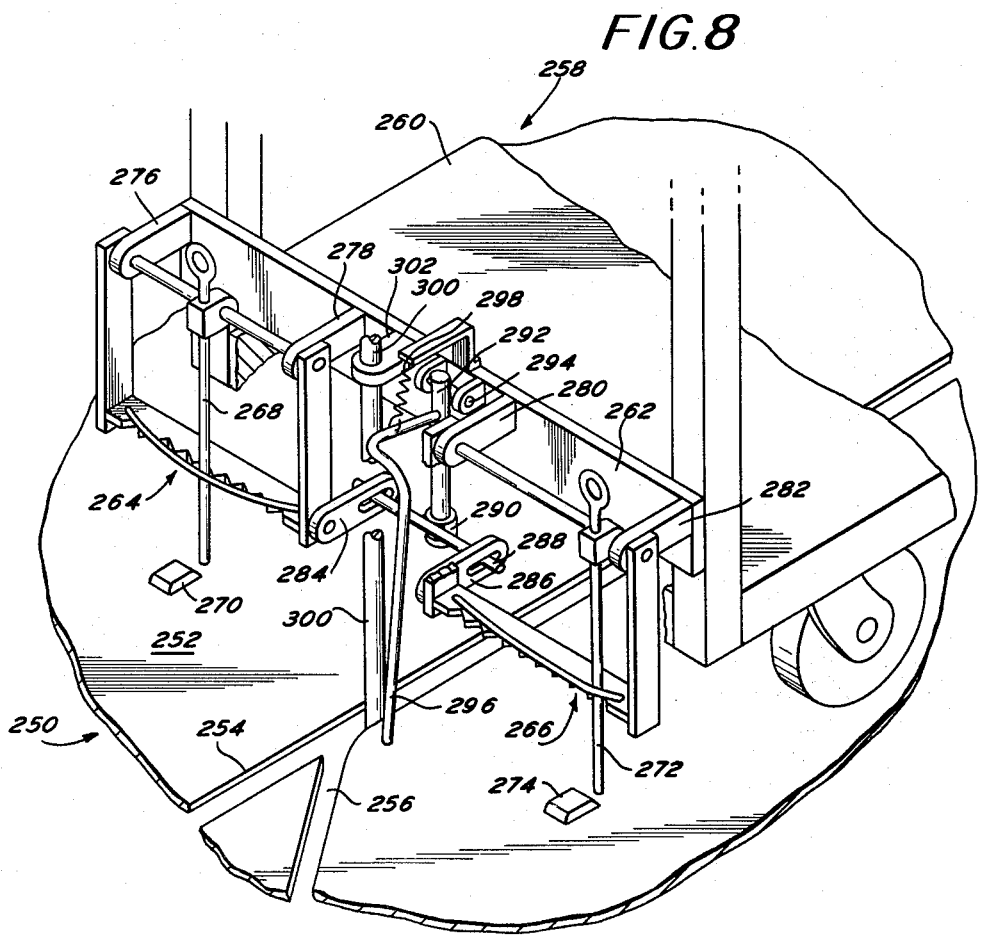

FIGURE 8 is a partial perspective view of a tow truck system in accordance with another embodiment of the present invention.

Referring to the drawing in detail, wherein like numerals indicate like elements, there is shown in FIGURE 1 a tow truck system designated generally as 10. The tow truck system 10 includes a reference surface such as the floor 12. The reference surface or floor 12 is provided with a main slot 14 having a plurality of shunt slots intersecting therewith at spaced points therealong. As illustrated in FIGURE 1, the main slot 14 is intersected by shunt slots 16 and 16a.

A tow truck designated generally as 18 is movingly supported on the surface 12 by wheels 20 and mounted for movement along the main slot 14. As will be made clear hereinafter, the truck 18 is provided with means for initiating switching of the truck from movement along the main slot 14 to movement along one of the shunt slots.

The truck 18 includes a generally flat platform or base 22. The supports for the wheels 20 are secured to the lowermost surface of the platform 22. At the front end of the truck 18 as illustrated in FIGURE 1, there are provided a pair of uprights 24 and 26 on opposite sides of the front end of the platform 22. The uprights 24 and 26 may be angle irons or the like and are interconnected by a brace 28.

When the number of shunt slots is relatively small, the truck 18 may be provided with a single selector rack 34 rotatably supported by the brackets 30 and 32 which project forwardly from the brake 28. The selector rack 34 may include a pair of spaced parallel side members 36 and 38 interconnected at their lower end by a cross member 42. The upper end of each side member 36 and 38 is rigidly secured to a bar 40 which is rotatably supported at the free ends of the brackets 30 and 32.

The forward edge of the cross member 42 is provided with a plurality of notches 44. The number of the notches 44 corresponds to the number of shunt slots. For purposes of clarity of illustration, the selector rack 34 is illustrated in FIGURE 1 as being disposed to one side of the tow pin 74. In working embodiments of the present invention, the selector rack 34 extends across the full width of the front end of the truck 18. A trip rod 46 is selectively positionable in each one of the notches 44. The trip rod 46 is disposed in an upright position and adjustably coupled to a housing 48. The housing 48 is rotatably and slidably supported by the rod 40.

The trip rod 46 is maintained in any one of the selected notches 44 by means of an elastometer 50. The elastometer 50 may be a rubber band or the like having its free ends secured to the ends of the cross member 42 or to the side members 36 and 38.

The trip rod 46 has its lower end positoned slightly above the surface 12 so that it may contact an abutment 52 on the surface 12. The trip rod 46 may be selectively positioned so as to be disposed in any one of the notches 44 thereby being capable of contacting any one of a plurality of abutments 52 spaced within limits at different distances from the main slot 14. The elastometer 50 maintains the trip rod 46 in the selected notch 44 and prevents accidental movement of the same. When it is desired to move the trip rod 46 from one notch to another notch, it is only necessary to pull the trip rod 46 toward you thereby rotating the same about the rod 40 and then move the trip rod 46 along the rod 40 so that it is opposite the desired notch. Thereafter, the trip rod will immediately seat itself in the selected notch due to the tension in the elastometer 50 upon release of the trip rod 46.

A means is provided on the truck 18 to initiate switching of the truck from movement along the main slot 14 to movement along one of the shunt slots in response to rotation of the selector rack 34. Such means includes a portion of the selector rack 34 such as trip arm 54 and an abutment arm 56. Abutment arm 56 is connected to a horizontally disposed rod 58. Rod 58. As illustrated in FIGURE 1, the member 64 propending from the truck 18. A pin support member 64 is fixedly coupled to the rod 58 and may project rearwardly or forwardly of the axis of rotation of the rod 58. As illustrated ni FIGURE 1, the member 64 projects rearwardly of the axis of rotation of the rod 58 and terminates in a downwardly projecting pin 66. The pin 66 is preferably adjustably coupled to the member 64 by any convenient means.

A removable plate 68 is supported by the surface 12 to one side of the main slot 14. The plate 68 is provided with an arcuate camming surface defined by the arcuate aperture 70. In the illustrated embodiment, the aperture 70 is orientated to cause the tow pin 74 to be switched from the main slot 14 to the shunt slot 16 when the pin 66 is caused to enter the aperture 70 and follow the contour thereof. The tow pin 74 is guided for movement upwardly and downwardly by means of a forwardly projecting bracket 72 supported by the brace 28. The tow pin 74 is preferably manually adjustable in elevation as illustrated in FIGURE 9 of U.S. Patent 2,936,718.

The operation of the system 10 is as follows:

It will be assumed that the trip rod 46 is positioned so as to cooperate with abutment 52. It will be further assumed that abutment 52 is the predetermined abutment which will cause the truck 18 to be switched from movement along the main slot 14 to movement along the shunt slot 16. When the lower end of the trip rod 46 contacts the abutment 52, the selector rack 34 is caused to rotate in a counterclockwise direction. As the selector rack 34 rotates, the arm 54 contacts the arm 56 thereby rotating the same in a clockwise direction about the axis of rod 58. Such rotation of the rod 58 and arm 56 causes the pin 66 to move downwardly into the aperture 70 which will be positioned therebelow at this particular point in the movement of the truck 18.

As the pin 66 follows the contour of the aperture 70, the truck 18 will be cammed in a counterclockwise direction about the longitudinal axis of the pin 66 thereby causing the tow pin 74 to enter the shunt slot 16.

As the pin 66 approaches the end of the aperture 70, the trip rod 46 will have cleared the abutment 52. Thereafter, the selector rack 34 will return to its original disposition thereby removing the force tending to rotate the abutment arm 56. Thereafter, the member 64 and the pin 66 will return to their original disposition under the retracting force of the spring 75. One end of the spring 75 is coupled to the member 64. The other end of the spring 75 is coupled to the platform 22.

In FIGURES 2 and 3, there is disclosed a tow truck system 10' which is identical with the tow truck system 10 except as will be made clear hereinafter. Hence, corresponding structure is provided with corresponding primed numerals. In general, the tow truck system 10' differs from the tow truck system 10 by the provision of a different abutment means, the use of two trip rods, the shunt slots do not intersect the main slot, and the rotative movement of the rod 58' is utilized to move the tow pin 74' out of the main slot and drop it into the shunt slot 16' during the switching operation.

The tow truck system 10' may have shunt slots such as shunt slot 16' which does not intersect the main slot 14'. Hence, a land portion 80 may be provided between the main slot 14' and the adjacent end of the shunt slot 16'. The abutment means 82 includes a pair of spaced abutments 84 and 86 adjacent opposite ends of a plate 88. The plate 88 is rotatably supported by a rod 90 and biased to a substantial horizontal disposition by means of springs 92 and 94. The plate 88 is substantially coplanar with the surface 12'. Below the surface 12', there may be provided a housing 96 within which the springs 92 and 94 are disposed.

The end of the rod 90 remote from the plate 88 is rotatably coupled to a rotatably supported axle 98. Axle 98 is provided with bearings 100 and 102 adjacent opposite free ends thereof. The direction of travel for a truck is indicated by arrow 85.

The selector rack 34' is provided with a pair of trip rods 46'. An identical selector rack designated generally as 35 may be provided on the opposite side of the tow pin with respect to the selector rack 34'. When properly disposed for cooperation with a selected abutment means 82, one of the trip rods 46' will contact abutment 84 and the other trip rod 46' will contact the abutment 86. As a result of such simultaneous contact, the selector rack 34' will be rotated as described above to cause the pin 66' to enter the aperture 70'. Such engagement between the abutment means 82 and the trip rods 46' is sufficient to overcome the pressure of springs 92 and 94. If only one of the abutments is engaged by one of the trip rods 46', the plate 88 will rotate about the longitudinal axis of the rod 90 thereby preventing the selector rack 34' from rotating about the longitudinal axis of the bar 40'. Hence, the pin 66' will not be actuated to cause a shunting of the truck 18'.

The ability of the rod 90 and plate 88 to rotate about the longitudinal axis of the axle 98 is a desirable, but not necessarily critical, feature of the abutment means 82. Hence, the abutments 84 and 86 will be movable obstructions on the surface 12' since they may be depressed into or below the surface 12' when run over by the wheels of a forklift truck or other material handling apparatus.

The truck 18' may be provided with a forwardly extending bifurcated member 78. One end of the member 78 is fixedly coupled to the rod 58' for rotation therewith. The bifurcated end of member 78 extends between adjustable collars 104 on the tow pin 74'. A spring 76 extends between the bracket 72' and a collar on the tow pin 74' thereby biasing the tow pin 74' downwardly. As the rod 58' rotates due to rotation of the selector rack 34', the tow pin 74' will be raised out of the main slot 14' and descend under the bias of gravity and spring 76 into the shunt slot 16'. Otherwise, the operation of the system 10' is identical with the operation of the system 10. It will be obvious that member 78 is not required if slot 16' intersects slot 14' thereby eliminating land 80.

In FIGURES 4–7, there is disclosed another embodiment of the present invention. In FIGURE 4, the front end portion of a tow truck designated generally as 110 is illustrated in side elevation. The truck 110 is rollingly supported on the reference surface or floor 114 by means of wheels 112. The reference surface 114 is provided with a main slot 116 and a plurality of shunt slots such as shunt slot 118. A tow pin 120, identical with the tow pin 74, is supported in an upright direction by means of a collar 122. Collar 122 guides the tow pin 120 for movement in an upward and downward direction.

The collar 122 is supported from the brace 126 by an angular bracket 124. The illustration in FIGURE 5 is taken along the line 5—5 in FIGURE 4.

The tow truck 110 is provided with a horizontally disposed platform or base 128 comparable to platform 22. At the front end of the truck 110, there is provided a pair of spaced selector racks 132 and 134 on opposite sides of the tow pin 120. Each of the selector racks 132 and 134 are identical with the selector rack 34 and rotatingly supported in the same manner. However, the selector racks 132 and 134 do not have an arm corresponding to arm 54. Instead, the selector racks 132 and 134 are provided with pockets 138 and 140, respectively.

In normal disposition, the selector racks 132 and 134 are in line with each other. In FIGURE 5, the trip rod 133, identical with trip rod 46, has contacted the abutment 166 thereby causing the selector rack 132 to rotate in a counterclockwise direction about the longitudinal axis of its bar corresponding to the bar 40.

Each of the selector racks 132 and 134 are provided with longitudinally extending guide plates 142 and 144, respectively, along the rear surface thereof. The truck 110 is provided with movable elements responsive to rotation of the selector racks 132 and 134 to initiate a switching action. Such movable elements include the angularly disposed arms 146 and 148 interconnected by a brace 149. The normal disposition of the free ends of the arms 146 and 148 is illustrated in phantom in FIGURE 5. Each of the arms 146, 148 and the brace 149 are fixedly secured to a nut 150 threadedly secured to a threaded end on an upright pin 152. Pin 152 is disposed in a central position on the truck 110 so that it extends into the main slot 116 and is substantially equally spaced from the surfaces defining the slot 116.

A horizontally disposed plate member 154 is fixedly secured at one end to the pin 152. The other end of the plate 154 is fixedly secured to a cylindrical sleeve 156. The sleeve 156 is telescoped over an upright bolt 158. The shank portion of the bolt 158 is adjustably connected to any convenient supporting surface on the truck 110 such as the bracket 124. A coil spring 160 surrounds the shank portion of the bolt 158 and biases the plate 154 and sleeve 156 against the head of the bolt 158. The telescoping arrangement between the bolt 158 and the sleeve 156 enables the pin 152 and plate 154 to rotate about the longitudinal axis of the bolt 158. The plate 154 and the pin 152 are maintained in a central disposition by means of springs 162 and 164 which are anchored at their upper end to the platform 128. The springs 162 and 164 are angularly disposed with respect to each other and coupled at their lower end to an eye on the plate member 154.

The abutments 166 and 168 are disposed on opposite sides of the main slot 116 on the surface 114 and offset from one another as illustrated more clearly in FIGURES 5 and 6. The first abutment to be contacted by a trip rod on the selector rack 132 is abutment 166. It will be noted that abutment 166 is on the opposite side of the main slot 116 from the shunt slot 118 along which is desired to transfer movement of the truck 110.

The operation of the system and truck illustrated in FIGURES 4–7 is as follows:

It is assumed that shunt slot 118 is the desired shunt slot and that the trip rods 133 and 136 have been orientated on the selector racks 132 and 134 to cause such switching. As the trip rod 133 contacts the abutment 166, the selector rack 132 is rotated to the disposion in FIGURE 5. Such rotation causes the arms 146 and 148 to rotate about the longitudinal axis of the pin 152 until the terminal portion of the arm 148 is disposed within the pocket 140 as illustrated in FIGURE 5. When selector rack 134 is rotated due to engagement between the trip rod 136 and abutment 168, the selector rack rotates to the disposition illustrated in FIGURE 6. Since the terminal end of the arm 148 is trapped in the pocket 140, such rotation of the selector rack 134 causes the pin 152 and plate member 154 to rotate about the longitudinal axis of the bolt 158 until the periphery of the pin 152 abuts the surface defining one side of the main slot 116.

The application of force against the surface defining one side of the main slot 116 by the pin 152 causes the truck 110 to rotate about the longitudinal axis of the pin 152. This results in the tow pin 120 being caused to enter the shunt slot 118. At this point in the switching operation, it will be noted that the selector rack 132 has already returned to its normal upright disposition. As soon as the tow pin 120 has entered the shunt slot 118, the trip rod 136 will have cleared the abutment 168 thereby relieving the camming force being applied by the pin 152. Thereafter, the selector rack 134 will return to its normal disposition as illustrated in FIGURE 5 and springs 162 and 164 will return the arms 146 and 148 to their normal disposition.

The offset nature of the abutments 166 and 168 is illustrated more clearly in FIGURE 7. Prior to contact between the trip rod 133 and the abutment 166, it will be noted that the tow pin 120 and the pin 152 are in line with one another in the main slot 116. During the switching operation, the relative disposition between the pins 120 and 152 is illustrated in FIGURE 7.

It will be obvious to those skilled in the art that each of the embodiments of the present invention contemplates a conveyor means having dogs at spaced points therealong below the floor or surface level for cooperation with the lowermost end of the tow pin. As is well known to those skilled in the art, the tow pin will be manually positioned so that it extends into the main slot. Thereafter, the next dog on the conveyor means will abuttingly engage the lowermost end of the tow pin and propel the truck along the main slot. The shunt slots need not be provided with a conveyor means. In order to effectively enable the tow pin to be disengaged with respect to the dog, the dog is preferably provided with angularly disposed cam surfaces as illustrated more clearly in copending application Serial No. 200,408, filed on June 6, 1962 and entitled Tow Truck System, now Patent No. 3,126,838.

It will be obvious to those skilled in the art that the spacing requirements relating to the location of the various abutments and/or camming apertures are a function of the speed at which the truck is being propelled along the main slot. Likewise, the length of the abutments are correlated to the speed of the truck so that the selector racks will maintain their rotated disposition for a sufficiently long enough period of time to enable the switching to be effected.

In FIGURE 8, there is illustrated another system in accordance with the present invention and designated generally as 250. The tow truck system 250 includes a reference surface or floor 252 having a main slot 254 and a plurality of intersecting shunt slots such as shunt slot 256. A truck designated generally as 258 is mounted for movement along the main slot and adapted to be transferred for movement along the shunt slot 256.

The truck 258 includes a platform or base 260 mounted on wheels and has a front brace 262 extending between uprights. A pair of identical selector racks 264 and 266 are provided on the front end of the truck 258 on opposite sides of the main slot 254. The selector racks 264 and 266 are each identical with the selector rack 34 in FIGURE 1.

Thus, the selector rack 264 includes a selectively positionable trip rod 268 adapted to contact an abutment 270. The selector rack 264 is supported from the brace 262 by spaced brackets 276 and 278. Selector rack 266 is supported from the brace 262 by spaced brackets 280 and 282. The selector rack 266 is provided with a selectively positionable trip rod 272 adapted to contact the abutment 274.

In place of the trip arm 54 on the selector rack 34, the selector racks 264 and 266 are provided with rearwardly extending actuating arms 284 and 286, respectively. Each of the actuating arms 284 and 286 is pivotably connected at one end to their respective selector racks. Each of the arms 284 and 286 is provided with elongated slots adjacent its opposite end. A rod 288 extends through the slot in each of the arms 284 and 286.

The rod 288 is horizontally disposed and fixedly secured to a sleeve 290. The sleeve 290 is rotatably mounted on an upright pin 292. Pin 292 is fixedly secured to a horizontally disposed axle 294. The free ends of axle 294 are rotatably supported by brackets projecting forwardly from the brace 262.

A stickpin 296 is fixedly secured at one end to the pin 292. The other end of the stickpin 296 is slightly spaced from the floor 252, is disposed laterally of tow pin 300, and projects forwardly to a point in advance of the tow pin 300. A spring 298 extending from the brace 262 to the stickpin 296 maintains the stickpin 296 in an inoperative disposition wherein its free end is slightly spaced from the floor 252. The tow pin 300 is guided for movement in an upward and downward direction by means of a bracket 302 extending forwardly from the brace 262.

The operation of the tow truck system 250 is as follows:

It will be assumed that the tow pin 300 is extending into the main slot 254 and that it is desired to transfer the truck 258 from movement along the main slot 254 to movement along the shunt slot 256. Further, it will be assumed that the trip rods 268 and 272 have been previously positioned so as to abut the abutments 270 and 274, respectively, to cause such switching. When the trip rods 268 and 272 contact the abutments 270 and 274, the selector racks 264 and 266 rotate in a counterclockwise direction thereby moving the arms 284 and 286 rearwardly.

When the arms 284 and 286 move rearwardly, and simultaneously, rod 288, pin 292, axle 294 and stickpin 296 rotate about the longitudinal axis of axle 294. When this occurs, the stickpin 296 will have its free end above the shunt slot 256 and continued rotative movement of the stickpin 296 causes the same to enter the shunt slot 256. As a result thereof, the truck 258 is caused to swing about an axis corresponding to the point at which the stickpin 296 enters the shunt slot 256 and contacts the surface defining one side of the shunt slot 256. Thereafter, the tow pin 300 is caused to enter the shunt slot 256 and the truck 258 will continue in the direction of the shunt slot 256.

As the trip rods 268 and 272 clear the abutments 270 and 274, respectively, the spring 298 will raise the stickpin 296 to its inoperative position and the selector racks 264 and 266 will return to their normal disposition. Before this occurs, the stickpin 296 will have been disposed within the shunt slot 256 for a sufficiently long period of time to enable the tow pin 300 to enter the shunt slot 256. If only one of the trip rods, such as trip rod 268, contacted its abutment, the selector rack 264 would rotate in a counterclockwise direction and the arm 284 would be moved in a rearward direction. Such rearward movement of the arm 284 would cause the rod 288 and sleeve 290 to rotate in a clockwise direction about the longitudinal axis of pin 292. As a result thereof, the stickpin 296 would not be rotated about the longitudinal axis of the axle 294. Hence, each of the selector racks must be rotated with simultaneous rearward movement of the arms 284 and 286 in order for the switching operation to be effected.

In each of the embodiments of the present invention illustrated above, the abutments may be of the type illustrated at 82 in FIGURES 2 and 3. The abutment means 82, when utilized with a pair of selector racks each having two trip rods, enables a truck to be shunted from the main slot into any one of 1,296 shunt slots. Thus, with thirty-six different positions being provided for the rods on each selector rack, there are a total of one thousand two hundred and ninety six (36×36) shunt slots into which a truck may be diverted from the main slot. Thus, it will be seen that the use of abutment means 82 in conjunction with a pair of selector racks such as selector racks 264 and 266 enables the tow truck system to be versatile and yet cause the truck to be shunted into a predetermined shunt slot. In regard to system 250, it will be obvious to those skilled in the art that the stickpin 296 could be caused to cooperate with a camming aperture in the floor 252 in the same manner as the pin 66 cooperates with camming aperture 70 in FIGURE 1. Hereinafter, stickpin 296 may be referred to as a pin or an upright pin.

The present invention may be embodied in other specific forms without departing from the spirit or essential attributes thereof and, accordingly, reference should be made to the appended claims, rather than to the foregoing specification as indicating the scope of the invention.

It is claimed:

1. In a tow truck system comprising a reference surface having a main slot and at least one shunt slot angularly disposed with respect to the main slot, a truck mounted for movement along the main slot, an upright tow pin on the truck extending into the main slot, at least one abutment on said surface, transfer means on the truck for cooperation with the abutment to cause said tow pin to be transferred from movement along the main slot to movement along a shunt slot, said transfer means including a selector rack, means mounting the selector rack on the front end of the truck for rotation about a substantially horizontal axis extending transversely across the truck, at least one selectively positionable trip rod on said rack, said rod being adapted to contact said abutment to cause rotation of said rack about said axis, and means supported by said truck and structurally interrelated with said rack for contact with a portion of the reference surface to initiate the transfer of the tow pin from movement along the main slot to movement along the shunt slot in response to rotation of said rack about said axis.

2. In a system in accordance with claim 1 wherein said last mentioned means includes a movable element mounted for rotation about a substantially horizontal axis substantially parallel to said first mentioned axis.

3. In a system in accordance with claim 1 wherein said last mentioned means includes a movable element mounted for rotation about an upright axis substantially perpendicular to said first mentioned axis.

4. In a system in accordance with claim 1 including a camming surface supported by said reference surface, said camming surface being positioned for cooperation with said last mentioned means to cause the truck to pivot about a vertical axis thereby enabling the tow pin to enter the shunt slot.

5. In a system in accordance with claim 1 wherein said last mentioned means is a movable element extending downwardly into the main slot.

6. In a system in accordance with claim 1 wherein said last mentioned means includes a movable element supported by said truck to one side of said main slot.

7. In a system in accordance with claim 1 including means responsive to rotation of said selector rack for causing said tow pin to move upwardly out of the main slot.

8. In a tow truck comprising a truck body, an upright tow pin on the truck body, transfer means on the truck for cooperation with an abutment located adjacent the intersection of a main slot and a shunt slot to cause said tow pin to be transferred from movement along the main slot to movement along the shunt slot, said transfer means including a selector rack, means mounting the selector rack on a front end of the body for rotation about a substantially horizontal axis extending transversely across the truck body, at least one selectively positionable trip rod on said rack, said rod extending downwardly from said rack for contact with an abutment, said rod being rotatable with said rack, and an element structurally interrelated with said rack and supported by said truck for movement into engagement with an abutment to cause the tow pin to be transferred from movement along the main slot to movement along the shunt slot, said element being responsive to rotation of said rack, and the rack being rotatable in response to contact between said rod and an abutment.

9. In a tow truck in accordance with claim 8 including means on said truck mounting said element for rotation about an axis substantially parallel to said first mentioned axis.

10. In a tow truck in accordance with claim 8 including means on said truck mounting said element for rotation about an axis substantially perpendicular to said first mentioned axis.

11. In a tow truck in accordance with claim 8 wherein said element is an upright pin projecting downwardly from said truck body, the longitudinal axis of said pin being substantially equidistant from the opposite sides of said truck body so that said pin may extend into a main slot.

12. In a tow truck in accordance with claim 8 wherein said element includes a pin, said pin having its longitudinal axis disposed to one side of the longitudinal axis of said truck body, and means mounting said pin for movement about an axis substantially parallel to said first mentioned axis.

13. A subcombination comprising a truck body, a selector rack, means supporting said selector rack for rotation about a substantially horizontal axis extending transversely across the body, said rack including a cross member having a plurality of notches, a trip rod disposed in one of said notches, means on said rack supporting said rod, and means selectively maintaining said trip rod in said one notch.

14. A subcombination in accordance with claim 13 wherein said rod supporting means includes a horizontally disposed member, means mounting said trip rod for rotation about the longitudinal axis of said last mentioned member and for reciprocation along said last mentioned member.

15. A subcombination in accordance with claim 13 wherein said last mentioned means is an elastometer.

16. An abutment device for use in a tow truck system comprising a plate-like member, first and second abutments secured to said plate-like member on the same side thereof adjacent opposite ends thereof, a substantially horizontally disposed rod, means mounting said plate-like member on said rod for rotation about the longitudinal axis of said rod, said member lying in a plane generally perpendicular to said axis.

17. An abutment device in accordance with claim 16 including means mounting said rod for rotation about an axis substantially perpendicular to the longitudinal axis of said rod, and means biasing said plate-like member to a horizontal disposition.

18. A tow truck comprising a truck body having wheels on a lower surface thereof, an upright tow pin guided by and supported by said truck body for movement in an upward and downward direction, transfer means on the truck body for cooperation with an abutment located adjacent the intersection of a main slot and a shunt slot for causing the tow pin to be transferred from movement along the main slot to movement along the shunt slot, said transfer means including at least one selector rack, means mounting said selector rack on said body for rotation about a substantially horizontal axis, at least one trip rod, means mounting said trip rod on said rack so that said trip rod may be selectively positioned at spaced points along said rack, said trip rod extending to a position below said rack, a pin in advance of the tow pin, means mounting said pin for rotation about a substantially horizontal axis, said tow pin being positioned along the longitudinal axis of said truck body, said pin being disposed to one side of the longitudinal axis of said truck body, means maintaining said pin in an inoperative disposition, and means for moving said pin from its inoperative position to an operative position in response to rotation of said rack, when said pin is in its inoperative position the lowermost end of the pin being in a plane which is above the plane of the lowermost end of the pin when the pin is in its operative position.

19. A tow truck comprising a truck body, an upright tow pin on the truck body, transfer means on the truck body for cooperation with an abutment located adjacent the intersection of a main slot and a shunt slot to cause the tow pin to be transferred from movement along the main slot to movement along the shunt slot, said transfer means including first and second selector racks mounted on the front end of said body on opposite sides of the tow pin, means mounting each selector rack for rotation about a horizontal axis extending transversely across the truck body, each selector rack having a trip rod extending downwardly therefrom, means mounting each trip rod for selective adjustment along its respective selector rack, an upright pin, means mounting said upright pin for movement betwen operative and inoperative dispositions, means on said truck for moving said upright pin to an operative disposition for contact with a reference surface to cause switching of the tow pin from movement along a main slot to movement along a shunt slot in response to rotation of at least one of said selector racks about said first mentioned axis.

20. A truck in accordance with claim 19 wherein said means mounting said upright pin for movement between operative and inoperative dispositions includes an upright member about which said upright pin may rotate in response to sequential rotation of said selector racks.

21. A tow truck in accordance with claim 19 wherein means mounting said upright pin for movement between operative and inoperative dispositions includes a horizontally disposed member about which the upright pin may rotate only in response to simultaneous rotation of said selector racks.

22. In a tow truck system comprising a reference surface having a main slot intersected by a shunt slot, said shunt slot being disposed at an acute angle with respect to the main slot, a tow truck mounted for movement along the main slot, means for selectively transferring said truck from movement along the main slot to movement along the shunt slot, said means including first and second abutments adjacent said intersection and on opposite sides of the main slot, said abutments being staggered with respect to each other so that said first abutment is contacted by a first element on said truck prior to contact between said second abutment and a second element on said truck, selectively actionable means on said truck including said first and second elements for moving an upright element on said truck to an operative disposition to initiate transfer of movement of said truck from along said main slot to movement along said shunt slot.

23. A tow truck in accordance with claim 8 including a second selector rack supported by said truck body on the front end thereof for rotation about a substantially horizontal axis extending transversely across the truck body, at least one selectively positionable trip rod on said second rack and extending downwardly from said second rack for contact with an abutment, said last-mentioned rod being rotatable with its rack, and said element being responsive to cause transfer of the tow pin only in response to simultaneous rotation of said racks.

24. A tow truck in accordance with claim 23 wherein said element is mounted for rotation about a horizontal axis substantially parallel to said first mentioned axis, and said element being disposed to one side of a longitudinal axis of said truck body, said longitudinal axis extending from the front end to the rear end of said truck body and being substantially equidistant from the sides of the truck body.

25. Apparatus in accordance with claim 23 including first and second abutments, each rack having a pair of trip rods, each abutment having a pair of spaced abutment surfaces adapted to be engaged by each trip rod on one of said racks, said element being responsive only to simultaneous rotation of said racks, said abutments being constructed and arranged to cause rotation of their respective racks only when each of its abutment surfaces are simultaneously engaged with one of the trip rods of its respective rack.

26. A system in accordance with claim 1 wherein said transfer means on the truck includes a second selector rack on the front end of the truck for rotation about its substantially horizontal axis extending transversely across the truck, and said last mentioned means being structurally interrelated with said racks to initiate transfer of the tow pin only in response to simultaneous rotation of said racks.

27. In a tow truck system comprising a main slot intersected by a shunt slot, a truck body, an upright tow pin on the truck body, transfer means on the truck for cooperation with an abutment to cause said tow pin to be transferred from movement along the main slot to movement along the shunt slot, said transfer means including first and second selector racks and a transfer element, means mounting the selector racks on a front end of the body for rotation about a substantially horizontal axis extending transversely across the truck body, two selectively positionable trip rods on each rack, each rod extending downwardly from its rack for contact with an abutment surface, each rod being rotatable with its rack, said transfer element being responsive only to simultaneous rotation of said racks, means on said racks for enabling the position of the rods thereon to be selectively adjusted so that the spacing between any two rods may be varied, a first abutment means for said first rack and having separate abutment surfaces adapted to be contacted by separate ones of the rods on said first rack, a second abutment means for said second rack and having separate abutment surfaces adapted to be contacted by separate ones of the rods on said second rack, each abutment means offering sufficient resistance to cause rotation of its associated rack only when the abutment surfaces thereon are simultaneously contacted by the rods on its associated rack.

28. A tow truck system comprising a reference surface having a main slot and a shunt slot, said shunt slot extending in a direction so that it forms an acute angle with respect to the adjacent portion of the main slot, the end of the shunt slot adjacent the main slot being free from a switch plate controlling shunting of the truck for movement along the main slot to movement along the shunt slot, a tow truck having a tow pin extending into the main slot for movement along said main slot, an abutment on said reference surface adjacent the intersection of said main and shunt slots, means on said truck for contact with said abutment, and means on said truck for cooperation with the portion of said reference surface in response to actuation by said abutment contacting means to cause the tow pin to be transferred from movement along the main slot to movement along the shunt slot.

References Cited by the Examiner
UNITED STATES PATENTS

| | | | |
|---|---|---|---|
| 2,936,718 | 5/60 | Bradt et al. | 104—172 |
| 3,103,183 | 9/63 | Bradt et al. | 104—88 |
| 3,103,895 | 9/63 | Bradt et al. | 104—88 |
| 3,126,838 | 3/64 | Bradt | 104—88 |

LEO QUACKENBUSH, *Primary Examiner.*